(12) United States Patent
Poon

(10) Patent No.: US 7,577,209 B2
(45) Date of Patent: Aug. 18, 2009

(54) DETERMINISTIC SPATIAL POWER ALLOCATION AND BIT LOADING FOR CLOSED LOOP MIMO

(75) Inventor: Ada S. Y. Poon, San Leandro, CA (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 10/955,597

(22) Filed: Sep. 30, 2004

(65) Prior Publication Data

US 2006/0067428 A1    Mar. 30, 2006

(51) Int. Cl.
*H04B 7/02* (2006.01)
(52) U.S. Cl. ...................................... 375/267
(58) Field of Classification Search ............... 375/267, 375/295, 299; 370/208, 334; 455/127.1
See application file for complete search history.

(56) References Cited

U.S. PATENT DOCUMENTS

| 7,065,144 B2* | 6/2006 | Walton et al. ............ 375/260 |
| 7,068,628 B2* | 6/2006 | Li et al. ................. 370/334 |
| 2002/0006168 A1 | 1/2002 | Lee et al. |
| 2002/0136327 A1* | 9/2002 | El-Gamal et al. ......... 375/308 |
| 2003/0072382 A1* | 4/2003 | Raleigh et al. ........... 375/267 |
| 2004/0013103 A1 | 1/2004 | Zhang et al. |
| 2004/0032910 A1 | 2/2004 | Horng et al. |
| 2004/0171359 A1* | 9/2004 | Tirkkonen et al. ....... 455/127.1 |
| 2005/0088959 A1* | 4/2005 | Kadous ................. 370/208 |

FOREIGN PATENT DOCUMENTS

| EP | 1434365 A2 | 6/2004 |
| TW | 564604 | 12/2003 |
| TW | 583854 | 4/2004 |
| TW | I199615 | 4/2004 |
| TW | I200794 | 5/2004 |
| WO | WO-0201732 A2 | 1/2002 |
| WO | WO-2004040833 A1 | 5/2004 |
| WO | WO-2006039614 A1 | 4/2006 |

OTHER PUBLICATIONS

Gritsch et al. ("Adaptive subspace modulation in spatially correlated MIMO systems" Personal, Indoor and Mobile Radio Communications, 2002. The 13th IEEE International Symposium on Sep. 15-18, 2002, Piscataway, NJ, USA,IEEE, vol. 4, Sep. 15, 2002, pp. 1772-1776.*

(Continued)

*Primary Examiner*—Chieh M Fan
*Assistant Examiner*—Jaison Joseph
(74) *Attorney, Agent, or Firm*—The Law Offices of John C. Scott, LLC; John C. Scott

(57) ABSTRACT

Spatial power allocation and bit loading are performed deterministically for a closed loop MIMO system.

6 Claims, 4 Drawing Sheets

OTHER PUBLICATIONS

Dardari et al (Bit-loading for Unequal Error Protection of Video Streams in Wireless Systems, IEEE international conference on Communications Jun. 20-24, 2004, pp. 3076-3080).*

Gritsch, G., et al., "Adaptive subspace modulation in spatially correlated MIMO systems", *Personal Indoor and Mobile Radio Communications, 2002*. The 13th IEEE International Symposium, Piscataway, NJ, USA, vol. 4, (Sep. 15, 2002), 1772-1776.

Tejera, P., et al., "Joint bit and power loading for MIMO OFDM based on partial channel knowledge", *Vehicular Technology Conference, 2004*, (May 17, 2004), 660-664.

Tolli, A., et al., "Compensation of interference non-reciprocity in adaptive TDD MIMO-OFDM systems", *Personal, Indoor, and Mobile Radio Communications, 2004*, (Sep. 5, 2004), 859-863.

* cited by examiner

US 7,577,209 B2

DETERMINISTIC SPATIAL POWER ALLOCATION AND BIT LOADING FOR CLOSED LOOP MIMO

TECHNICAL FIELD

The invention relates generally to wireless communication and, more particularly, to techniques for performing power allocation and bit loading in closed loop MIMO systems.

BACKGROUND OF THE INVENTION

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link. MIMO may be performed as either an open loop or a closed loop technique. In open loop MIMO, a transmitter has no specific knowledge of the condition of the channel before signals are transmitted to a receiver. In closed loop MIMO, on the other hand, channel-related information may be fed back from the receiver to the transmitter to allow the transmitter to precondition transmit signals before they are transmitted to better match the present channel state. The amount of feedback information that is delivered from a receiver to a transmitter in a system using closed loop MIMO can be very large, especially in systems using multicarrier communication. There is a general need for strategies to reduce the amount of feedback used in a closed loop MIMO system.

DETAILED DESCRIPTION

Figure 1:
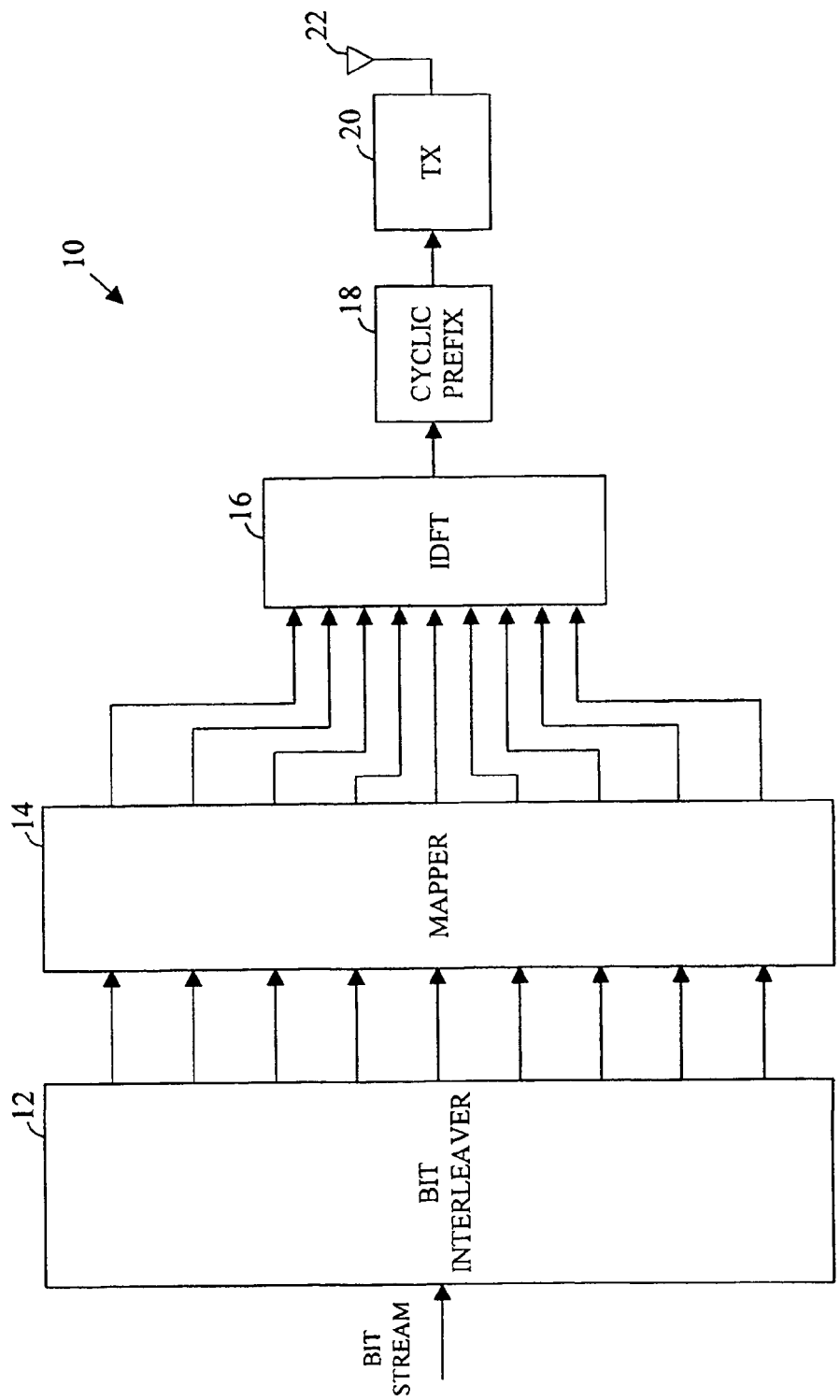
FIG. 1 is a block diagram illustrating an example orthogonal frequency division multiplexing (OFDM) transmitter arrangement.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Multicarrier communication is a technique for transmitting data that divides the data into multiple pieces and then transmits the pieces in parallel via a number of relatively narrowband sub-carriers or tones. One multicarrier technique that is gaining popularity is orthogonal frequency division multiplexing (OFDM) in which the various sub-carriers are orthogonal to one another. FIG. 1 is a block diagram illustrating an example OFDM transmitter arrangement 10. As illustrated, the OFDM transmitter arrangement 10 may include one or more of: a bit interleaver 12, a mapper 14, an inverse discrete Fourier transform unit 16, a cyclic prefix unit 18, and a radio frequency (RF) transmitter 20. The RF transmitter 20 may be coupled to one or more antennas 22 to facilitate the transmission of signals into an external wireless channel. The bit interleaver 12 is operative for distributing bits within an input bit stream among the various sub-carriers of the OFDM system. Each of the outputs of the bit interleaver 12 may correspond to one of the sub-carriers of the system. The mapper 14 then maps the bit(s) associated with each subcarrier to a corresponding modulation symbol based on a particular modulation constellation being used. The modulation symbols output by the mapper 14, which correspond to the sub-carriers of the system, are delivered to the inputs of the IDFT 16 which converts the symbols from a frequency domain representation to a time domain representation. Any type of IDFT may be used (e.g., an inverse fast Fourier transform (IFFT), etc.).

The cyclic prefix unit 18 adds a cyclic prefix to the time domain output of the IDFT 16 to form an OFDM symbol. The cyclic prefix is added to the time domain signal to reduce the occurrence of, for example, inter-symbol interference (ISI) and inter-carrier interference (ICI) in the system. The RF transmitter 20 may, among other things, up-convert and amplify the OFDM symbol before it is transmitted from the antenna(s) 22. It should be appreciated that the OFDM transmitter arrangement 10 of FIG. 1 is merely an example of one type of multicarrier transmitter architecture that may be used in accordance with the present invention. Other multicarrier transmitter architectures may alternatively be used.

Different sub-carriers within a transmitted multicarrier (e.g., OFDM, etc.) signal may experience different levels of multi-path fading within the wireless channel. To compensate for such effects, power allocation and bit loading techniques may be implemented within the multicarrier system. "Power allocation" refers to techniques for selecting transmit power levels for sub-carriers in a multicarrier system based on knowledge of the corresponding channel. Thus, more power can be allocated to sub-carriers that experience larger amounts of fading in the channel, while less power may be allocated to sub-carriers that experience smaller amounts of fading in the channel. "Bit loading" refers to techniques that use different modulation schemes (involving different numbers of bits) for different sub-carriers based on corresponding channel information (e.g., channel gains). Thus, a sub-carrier having a higher channel gain may use a higher order modulation scheme to carry more bits (e.g., 64-QAM) while a sub-carrier having a lower channel gain may use a lower order modulation scheme to carry less bits (e.g., BPSK). In adaptive schemes, the power allocation and bit loading settings may continually change in a system based upon changing channel conditions. To implement adaptive power allocation and bit loading within a multicarrier system, instantaneous channel related feedback information must continuously be delivered from a receiving device to a transmitting device.

Figure 2:
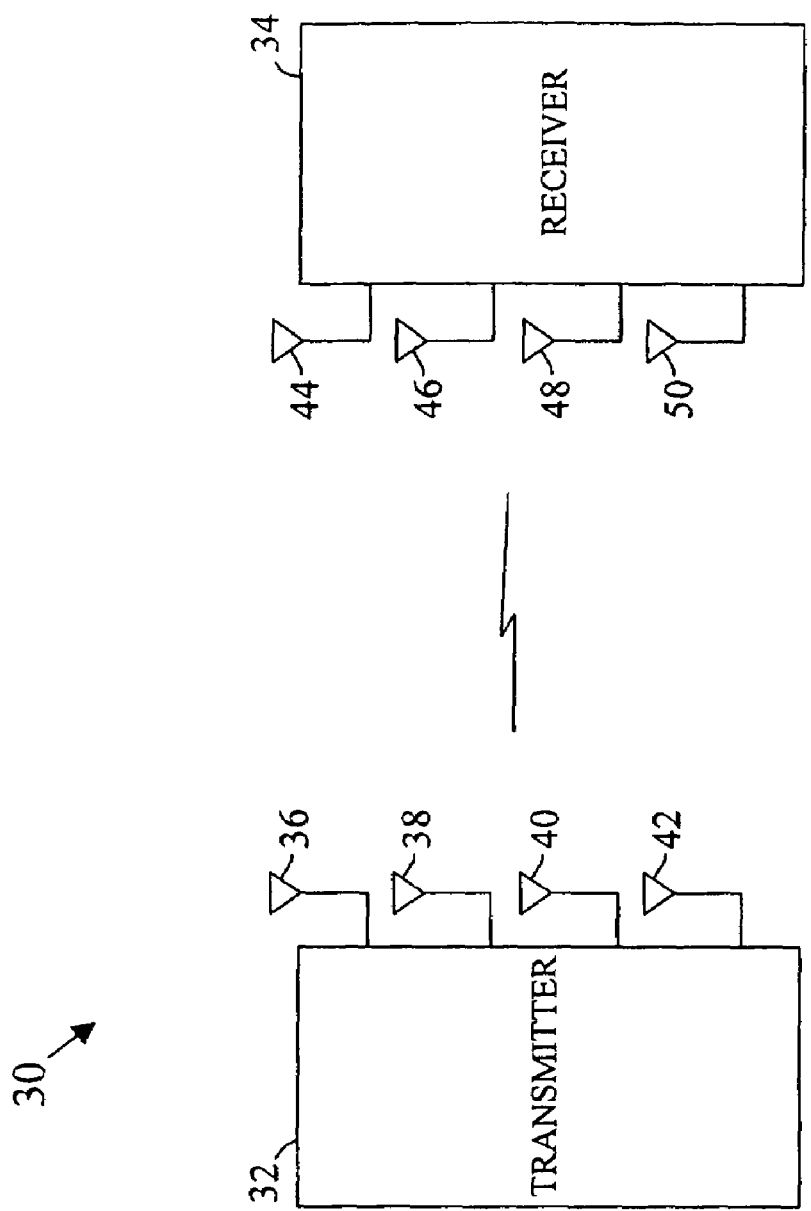
FIG. 2 is a block diagram illustrating an example wireless communication link in a MIMO-based wireless system in accordance with an embodiment of the present invention.

FIG. 2 is a block diagram illustrating an example wireless communication link 30 in a multiple input, multiple output (MIMO) based wireless system in accordance with an embodiment of the present invention. As illustrated, a wireless transmitter 32 is communicating with a wireless receiver 34 via a wireless channel. The transmitter 32 has four transmit antennas 36, 38, 40, 42 and the receiver 34 has four receive antennas 44, 46, 48, 50. The wireless channel is a multiple input, multiple output (MIMO) channel. In a MIMO system implementing multicarrier communication, each of the transit antennas 36, 38, 40, 42 may have a corresponding multicarrier transmitter associated with it (e.g., the OFDM transmitter arrangement of FIG. 1, etc.). Although illustrated with four transmit antennas 36, 38, 40, 42 and four receive antennas 44, 46, 48, 50 in FIG. 2, it should be appreciated that a communication link in a MIMO system may include any number (greater than 1) of transmit antennas and any number (greater than 1) of receive antennas.

The wireless link 30 of FIG. 2 may utilize "closed loop" MIMO techniques. That is, the receiver 34 may transmit channel-related feedback information to the transmitter 32 for use by the transmitter 32 in developing transmit signals. The same antennas may (or may not) be used for the reverse direction link that are used for the forward direction link. By utilizing knowledge of the channel, the transmitter 32 can tailor the transmit signal to the channel in a manner that simplifies receiver processing in and/or improves the performance of the receiver 34. The receiver 34 can generate the channel-related feedback information by, for example, appropriately processing training signals received from the transmitter 32. Any type of antennas may be used by the transmitter 32 and the receiver 34 including, for example, dipoles, patches, helical antennas, antenna arrays, and/or others, including combinations of the above.

Various methods of developing channel-related feedback information are known in the art. One method of developing channel-related feedback information makes use of a mathematical technique known as singular value decomposition (SVD). When SVD is utilized in a MIMO-based system, the overall technique may be referred to as SVD-MIMO. In a MIMO-based system, the wireless channel may be characterized using an $n_{RX} \times n_{TX}$ channel matrix H, where $n_{RX}$ is the number of receive antennas and $n_{TX}$ is the number of transmit antennas. Using SVD, the channel matrix H may be decomposed as follows:

$$H = U\Sigma V^H$$

where U and V are unitary matrices (i.e., matrices with orthonormal columns and unit amplitude), $\Sigma$ is a diagonal matrix with positive elements, and $V^H$ is the Hermitian of matrix V. In the channel matrix decomposition expression set out above, the matrix V may be referred to as the beam forming matrix (precoder). This beam forming matrix V may be determined in the receiver 34 by first determining the channel matrix H (using, for example, received training signals) and then decomposing the matrix H using SVD techniques (or other similar techniques). The beam forming matrix V may then be transmitted back to the transmitter 32 to be used in the generation of a subsequent transmit signal. In a multicarrier system, a separate matrix V may be required for each subcarrier in the system.

The elements of the diagonal matrix $\Sigma$ in the decomposed channel matrix are known as the singular values (or eigenvalues) of the channel matrix H. Current adaptive power allocation and bit loading schemes for use in MIMO systems determine the power level and bit loading on each spatial channel based on the instantaneous matrix $\Sigma$ for each sub-carrier. Because the information within a $\Sigma$ matrix needs to be delivered from the receiver to the transmitter for each sub-carrier of each spatial channel, the overall amount of feedback information to perform these adaptive schemes may be quite large. Using this approach, a different power level and bit load may be developed for each subcarrier of each spatial channel within the transmitter. In order to reduce the overall amount of feedback required to perform power allocation and bit loading, an average $\Sigma$ may be developed for each of the spatial channels over all sub-carriers, and the power level and bit loading may then be determined over the averages. For example, the power allocation and bit loading may be determined over:

$$1/K[\Sigma^2(1)+\Sigma^2(2)+\ldots+\Sigma^2(K)]$$

where K is the number of sub-carriers. In such an approach, the power level and bit loading will be the same across all tones within each spatial channel. The power level and bit loading may vary, however, across spatial channels. When K is large, the above-described approach is similar to performing power water filling and bit loading over the expected value of $\Sigma^2(k)$, the first-order channel statistics (where k is the sub-carrier index). Therefore, in one aspect of the present invention, a deterministic approach is taken in which channel allocation and bit loading are determined a priori in a MIMO-based system based on the statistics of the channel. Use of such an approach dispenses with the need for instantaneous feedback to perform power allocation and bit loading, as is required in adaptive schemes. That is, once determined for a particular channel environment, the power allocation and bit loading do not change. Because the bit loading does not change with time, the data rate for a particular spatial channel is invariant from packet to packet, which simplifies the design and implementation of other elements within the transceiver chain; in particular, the space-frequency interleaver.

Figure 3:
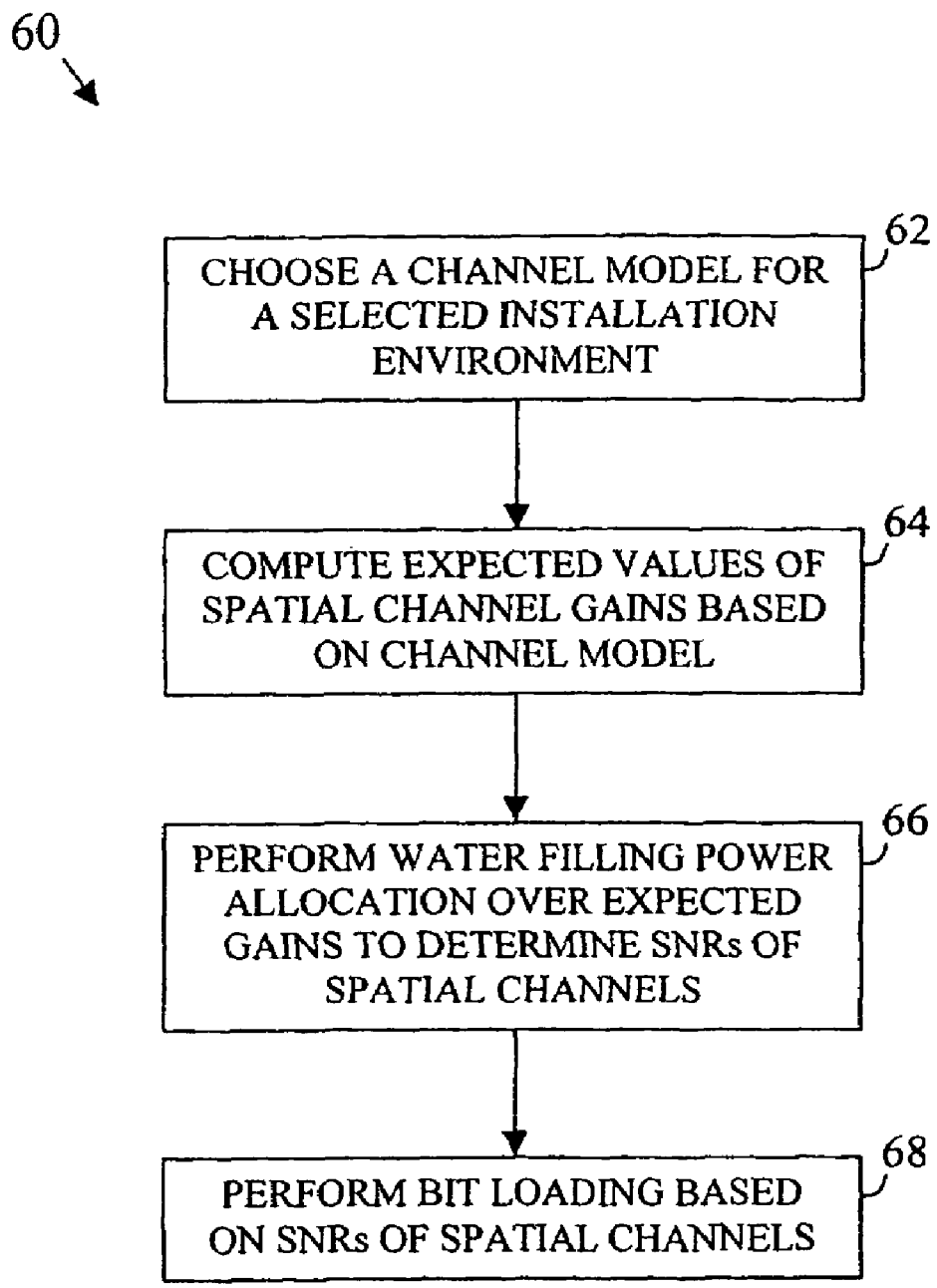
FIG. 3 is a flowchart illustrating an example method for deterministically performing power allocation and bit loading for a MIMO transmitter in accordance with an embodiment of the present invention.

FIG. 3 is a flowchart illustrating an example method 60 for deterministically performing power allocation and bit loading for a MIMO transmitter in accordance with an embodiment of the present invention. First, a channel model is chosen for a selected installation environment (block 62). Expected values of spatial channel gains may then be calculated based on the chosen channel model (block 64). Water filling power allocation is then performed over the expected gains to determine the signal to noise ratios (SNRs) of the spatial channels (block 66). Bit loading may then be performed based on the SNRs of the spatial channels (block 68). In the discussion that follows, the method 60 is discussed in greater detail.

The environment within which a wireless network is to be implemented will typically have certain characteristics that distinguish the region from other areas. In block 62 of the method 60, a channel model may be selected that approximates the targeted environment. For example, for dense environments (e.g., offices, hotspots, etc.), it is known that the independent and identically distributed (i.i.d.) fading channel provides an accurate model. Other possible channel models include the IEEE P802.11 TGn channel models A-F, etc. Based on the selected channel model for the targeted environment, the expected values of the spatial channel gains are computed (i.e., $E[\Sigma^2(k)]$). For the i.i.d. fading channel model, for example, the joint density for the elements of $\Sigma^2(k)$ is:

$$f_{\Lambda_1,\Lambda_2,\cdots,\Lambda_{\min\{M,N\}}}(\lambda_1,\lambda_2,\cdots,\lambda_{\min\{M,N\}}) = C\exp\left(-\sum_i \lambda_i\right)\prod_i \lambda_i^{|M-N|}\prod_{i<j}(\lambda_i-\lambda_j)^2$$

where $\lambda_1 > \lambda_2 > \ldots > \lambda_{\min(M,N)}$, $\lambda_i$ denotes the $i^{th}$ diagonal element of $\Sigma^2(k)$, C is a normalizing constant, M is the number of transmit antennas, and N is the number of receive antennas. Integrating over all $\lambda_j$'s (except $\lambda_i$) in an ordered manner gives the distribution of the gain of the $i^{th}$ spatial channel as:

$$ff_{\Lambda_i}(\lambda) = \int_\Omega f_{\Lambda_1,\Lambda_2,\ldots,\Lambda_{\min\{M,N\}}}(\lambda_1,\ldots\lambda_{i-1},\lambda,\lambda_{i+1},\lambda_{\min\{M,N\}}) d\lambda_1\ldots d\lambda_{i-1} d\lambda_{i+1}\ldots d\lambda_{\min\{M,N\}}$$

where $\Omega = \{(\lambda_1,\ldots,\lambda_{i-1},\lambda_{i+1},\ldots,\lambda_{\min\{M,N\}}) \in \Re^{\min\{M,N\}-1}: \lambda_1 > \ldots > \lambda_{i-1} > \lambda > \lambda_{i+1} > \ldots > \lambda_{\min\{M,N\}}\}$. Therefore, the expected gain of the $i^{th}$ spatial channel is:

$$E[\Lambda_i] = \int_0^\infty \lambda f_{\Lambda_i}(\lambda) d\lambda$$

The expected gains for the i.i.d. fading channel model for 2×2, 3×3, and 4×4 systems have been pre-calculated and are set out in Table 1 below.

TABLE 1

| M = N | E[Λ₁] (dB) | E[Λ₂] (dB) | E[Λ₃] (dB) | E[Λ₄] (dB) |
|---|---|---|---|---|
| 2 | 5.44 | −3.01 | | |
| 3 | 8.14 | 3.32 | −4.77 | |
| 4 | 9.90 | 6.44 | 1.96 | −6.02 |

A water filling power allocation operation is next performed over the expected gains. Suppose P and $N_0$ are the signal and noise powers, respectively. Then, the power allocated to the $i^{th}$ spatial channel may be given by:

$$P_i = \max\left\{0, \mu - \frac{N_0}{\lambda_i}\right\}$$

where μ satisfies:

$$\sum_i \max\left\{0, \mu - \frac{N_0}{\lambda_i}\right\} = P$$

For example, if $P/N_0$ is 20 dB, the SNR of the $i^{th}$ spatial channel may be as shown in Table 2.

TABLE 2

| M = N | E[Λ₁] P₁/N₀ (dB) | E[Λ₂] P₂/N₀ (dB) | E[Λ₃] P₃/N₀ (dB) | E[Λ₄] P₄/N₀ (dB) |
|---|---|---|---|---|
| 2 | 22.50 | 13.90 | | |
| 3 | 23.50 | 18.64 | 10.22 | |
| 4 | 24.07 | 20.59 | 16.04 | 7.45 |

Bit loading is next performed based on the computed SNRs of the individual spatial channels. If $SNR_n$ is the required SNR for the $n^{th}$ bit loading configuration, and $SNR_1 < SNR_2 < \ldots$, then the bit loading configuration for the $i^{th}$ spatial channel, $n_i$, satisfies:

$$SNR_{n_i} \leq \frac{E[\Lambda_i] P_i}{N_0} < SNR_{n_i+1}$$

For example, if the available modulation schemes are BPSK, QPSK, 16-QAM, and 64-QAM, then the required SNR for the respective modulation schemes (bit loading configurations) to achieve $P_b = 10^{-3}$ are shown in Table 3 below.

TABLE 3

| Modulation Scheme | SNR_n (dB) |
|---|---|
| BPSK | 6.80 |
| QPSK | 9.80 |
| 16-QAM | 16.55 |
| 64-QAM | 22.55 |

The resulting bit loading at $P/N_0 = 20$ dB is shown in Table 4 below:

TABLE 4

| | Modulation Scheme | | | |
|---|---|---|---|---|
| M = N | 1ˢᵗ channel | 2ⁿᵈ channel | 3ʳᵈ channel | 4ᵗʰ channel |
| 2 | 16-QAM | QPSK | | |
| 3 | 64-QAM | 16-QAM | QPSK | |
| 4 | 64-QAM | 16-QAM | QPSK | BPSK |

In at least one implementation, the method 60 may be performed at the time of initial installation of a wireless network within a particular location. When a device is initially deployed, an assessment may be made of the deployment environment and a channel model may be selected that closely approximates the environment. Settings for power allocation and bit loading may then be determined for the device or systems as described above. In another approach, a wireless device may be provided that stores power allocation and bit loading information for a plurality of different types of targeted environments. These values may have been pre-calculated using the above-described techniques. When the device is deployed, an assessment is made as to the deployment environment and associated power allocation and bit loading information may then be retrieved and used to configure the device. Once the power allocation and bit loading has been set for a particular device, the settings may remain the same during the operational life of the network device. That is, the values will not adapt during operation based on changing channel conditions (although new settings may be generated if the device is moved to a location having different channel statistics).

In yet another possible scenario, devices may be manufactured with a specific type of targeted environment in mind. For example, it may be determined that a device will always be used in an office or office-like environment. Based on this assumption, a corresponding channel model may be selected (e.g., the i.i.d. fading channel model, etc.) and the above-described procedure may be followed to determine the appropriate power allocation and bit loading settings. These setting may then be programmed into the device before the device is sold to the public. As described above, use of the inventive techniques may dispense with the need to provide instantaneous feedback for power allocation and bit loading purposes.

Figure 4:
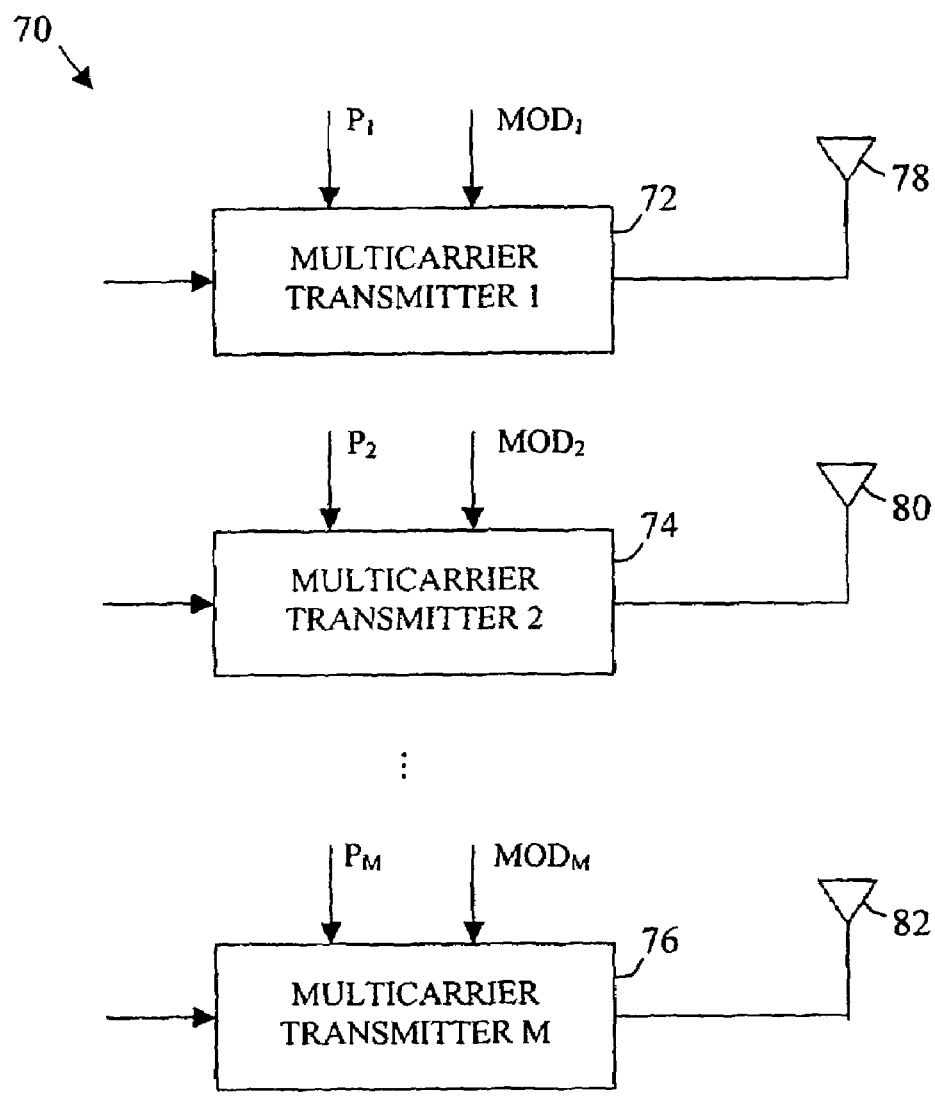
FIG. 4 is a block diagram illustrating transmitter functionality within a multicarrier MIMO device in accordance with an embodiment of the present invention.

FIG. 4 is a block diagram illustrating transmitter functionality within a multicarrier MIMO device 70 in accordance with an embodiment of the present invention. As shown, the multicarrier MIMO device 70 may include a plurality of multicarrier transmitters 72, 74, 76 that each correspond to a transmit antenna 78, 80, 82 of the device. The multicarrier transmitters 72, 74, 76 may use, for example, the architecture of the OFDM transmitter arrangement 10 of FIG. 1 or some other multicarrier transmitter architecture. After power allocation and bit loading have been determined, the various transmitters 72, 74, 76 may be configured with the corresponding power levels $P_1, P_2, \ldots, P_M$ and the corresponding modulation schemes $MOD_1, MOD_2, \ldots, MOD_M$. For example, if the OFDM transmitter architecture of FIG. 1 is being used, the mapper 14 within each transmitter may be configured at this time to operate with a corresponding modulation scheme. Also, variable gain devices (e.g., variable gain amplifiers, etc.) may be present within each transmitter to vary the power level of the associated spatial channel. For example, if the OFDM transmitter architecture of FIG. 1 is being used, the RF transmitter 20 within each multicarrier transmitter may include variable gain power amplification. Other approaches may alternatively be used.

The techniques and structures of the present invention may be implemented in any of a variety of different forms. For example, features of the invention may be embodied within laptop, palmtop, desktop, and tablet computers having wireless capability; personal digital assistants having wireless capability; wireless network interface cards (NICs) and other network interface structures; cellular telephones and other handheld wireless communicators; pagers; satellite communicators; cameras and other optical equipment having wireless capability; audio/video devices having wireless capability; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, two or more of the blocks in a block diagram may be implemented within a single digital processing device. The digital processing device, may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A power allocation and bit loading method for use in a multiple input multiple output (MIMO) system, comprising:
   choosing a channel model for a targeted installation environment of a multicarrier MIMO device, said channel model having channel statistics that approximate statistics of said targeted installation environment;
   computing statistical expected values of spatial channel gains using said channel statistics of said channel model;
   performing water filling power allocation over said expected gain values to determine signal-to-noise ratios (SNRs) for spatial channels; and
   performing bit loading based on said SNRs of said spatial channels;
   wherein performing water filling power allocation includes evaluating the expression:

$$P_i = \max\left\{0, \mu - \frac{N_0}{\lambda_i}\right\}$$

where $P_i$ is the power of the $i^{th}$ spatial channel, $N_0$ is the noise power, $\lambda_i$ is the gain of the ith spatial channel, and $\mu$ satisfies:

$$\sum_i \max\left\{0, \mu - \frac{N_0}{\lambda_i}\right\} = P$$

where P is the total signal power.

2. The method of claim 1, wherein:
   performing bit loading based on said SNRs of said spatial channels includes selecting a modulation scheme for each spatial channel based on said SNRs.

3. The method of claim 1, further comprising:
   configuring said MIMO device based on results of performing water filling power allocation and performing bit loading, wherein a power allocation and bit loading configuration of said MIMO device does not adapt with changing channel conditions during subsequent operation of said MIMO device, regardless of whether said MIMO device is moving or stationary.

4. An article comprising a computer readable storage medium having instructions stored thereon that, when executed by a computing platform, operate to:
   receive an indication of a channel model chosen for a targeted installation environment of a multicarrier MIMO device, said channel model having channel statistics that approximate statistics of said targeted installation environment;
   compute statistical expected values of spatial channel gains using said channel statistics of said channel model;
   perform water filling power allocation over said expected gain values to determine signal-to-noise ratios (SNRs) for spatial channels; and
   perform bit loading based on said SNRs of said spatial channels;

wherein said water filling power allocation operation includes operation to evaluate the expression:

$$P_i = \max\left\{0, \mu - \frac{N_0}{\lambda_i}\right\}$$

where $P_i$ is the power of the $i^{th}$ spatial channel, $N_0$ is the noise power, $\lambda_i$, is the gain if the ith spatial channel, and $\mu$ satisfies:

$$\sum_i \max\left\{0, \mu - \frac{N_0}{\lambda_i}\right\} = P$$

where P is the total signal power.

5. The article of claim 4, wherein:
operation to perform bit loading based on said SNRs of said spatial channels includes operation to select a modulation scheme for each spatial channel based on said SNRs.

6. The article of claim 4, wherein said instructions further operate to:
configure said MIMO device based on results of said water filling power allocation and bit loading, wherein a power allocation and bit loading configuration of said MIMO device does not adapt with changing channel conditions during subsequent operation of said MIMO device, regardless of whether said MIMO device is moving or stationary.

* * * * *

UNITED STATES PATENT AND TRADEMARK OFFICE
CERTIFICATE OF CORRECTION

PATENT NO.       : 7,577,209 B2
APPLICATION NO.  : 10/955597
DATED            : August 18, 2009
INVENTOR(S)      : Ada S. Y. Poon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this

Seventh Day of September, 2010

David J. Kappos
*Director of the United States Patent and Trademark Office*